(12) United States Patent
Uchiyama et al.

(10) Patent No.: US 6,616,176 B2
(45) Date of Patent: Sep. 9, 2003

(54) AIRBAG DEVICE

(75) Inventors: Atsuyuki Uchiyama, Frankfurt-Praunhein (DE); Tadahiro Igawa, Hikone (JP)

(73) Assignee: Takata Corporation, Tokyo (JP)

( * ) Notice: Subject to any disclaimer, the term of this patent is extended or adjusted under 35 U.S.C. 154(b) by 0 days.

(21) Appl. No.: 09/992,564

(22) Filed: Nov. 26, 2001

(65) Prior Publication Data

US 2002/0063415 A1 May 30, 2002

(30) Foreign Application Priority Data

Nov. 24, 2000 (JP) ........................................ 2000-357924
Oct. 1, 2001 (JP) ........................................ 2001-305434

(51) Int. Cl.$^7$ ............................................. B60R 21/20
(52) U.S. Cl. ..................... 280/728.3; 280/731; 280/732
(58) Field of Search ........................... 280/728.3, 728.2, 280/728.1, 732, 731

(56) References Cited

U.S. PATENT DOCUMENTS 5,851,023 A    12/1998  Nagata et al.
6,173,988 B1    1/2001  Igawa ..................... 280/728.2

FOREIGN PATENT DOCUMENTS

| DE | 197 50 182 A1 | 5/1999 |
| DE | 100 57 003 A1 | 9/2001 |
| EP | 0 415 362 A2 | 3/1991 |
| GB | 2270882 | * 2/1994 |
| JP | 07-117609 | 5/1995 |
| WO | WO 99/29539 A1 | 6/1999 |

* cited by examiner

*Primary Examiner*—Eric Culbreth
(74) *Attorney, Agent, or Firm*—Foley & Lardner (57) ABSTRACT

An airbag device which is easily aligned in an instrument panel and which includes a lid that does not lift from the instrument panel. The airbag device includes a retainer, an airbag folded and accommodated in the retainer, a lid for covering the opening of the retainer, and an inflator for deploying the airbag. The device includes a belt wrapped around the outside of the retainer. The ends of the belt are connected to the lid. The edge of the opening of the instrument panel includes two steps. The first step supports the edge of the lid and the second step supports a spacer. The belt has an elastically deformable portion that stretches to ensure that the belt remains in elastic contact with the bottom of the retainer.

17 Claims, 11 Drawing Sheets

AIRBAG DEVICE

BACKGROUND

The present invention relates to an airbag device installed in a vehicle and, more particularly, to an airbag device suitably used as a passenger airbag device for protecting a front seat passenger in a vehicle.

In a passenger airbag device, an airbag is typically accommodated within a canister-like retainer with the retainer covered by a lid. The passenger airbag device is mounted to an instrument panel of a vehicle. In the event of a vehicle collision, an inflator emits gas into the airbag, thereby inflating the airbag. The lid opens toward the inside of a vehicle cabin due to the pressing force of the airbag thereby allowing the airbag to be inflated inside the vehicle cabin.

An existing airbag device provides the lid to be connected to the retainer by belts so that the lid can freely shift in directions out of and into the instrument panel (hereafter these directions will be referred to as "upward and downward directions").

Figure 8:
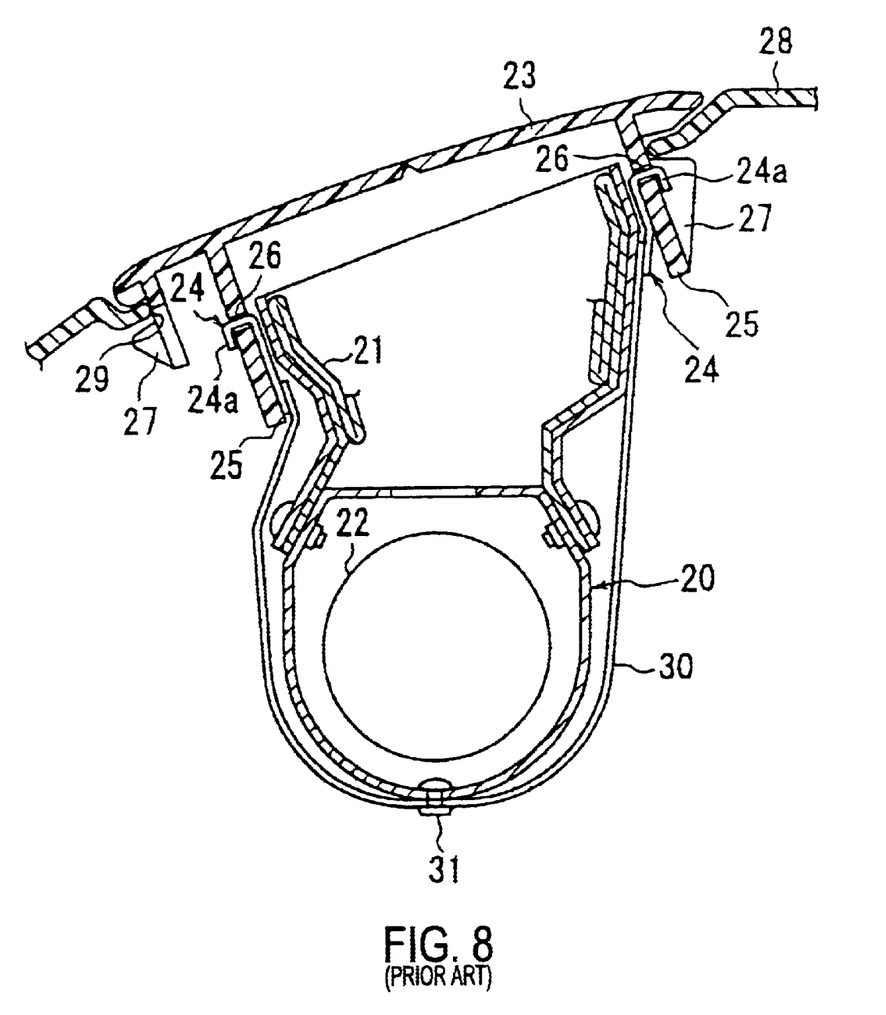
FIG. 8 is a sectional view showing a conventional air bag device.

FIG. 8 is a sectional view showing the aforementioned conventional passenger airbag device in which an airbag 21 is arranged in the inside of a retainer 20 and an inflator 22 is disposed beneath the airbag 21. The top opening of the retainer 20 is covered by a lid 23. Arranged on both sides of the retainer 20 are hook fittings 24 of which hook portions 24a are inserted in holes 26 formed in legs 25 of the lid 23. The hook fittings 24 are connected to the retainer 20 by belts 30. The belts 30 are fixed to the bottom of the retainer 20 by rivets 31. The lid 23 includes engaging pieces 27 formed on the outside of the legs 25. The periphery of a mounting opening 29 for an airbag device of the instrument panel 28 is engaged with the engaging pieces 27, whereby the lid 23 is fixed to an instrument panel 28.

In the conventional example shown in FIG. 8, the belts 30 are fixed to the retainer 20 by the rivets 31. As a result, the reaction force from the belts 30 may be applied to the lid 23 fitted to the instrument panel 28. Therefore, stress may be constantly applied to the peripheral edge of the opening 29 of the instrument panel 28 and the periphery of the lid 23. Due to the pressing force of the belts 30, the lid 23 is pushed upward because of a clearance between the engaging pieces 27 and the opening 29 of the instrument panel 28. As a result, the lid 23 may undesirably lift slightly from the instrument panel 28.

In the airbag device shown in FIG. 8, during installation of the airbag device to the instrument panel, the movable range of the lid 23 is limited. This may create difficulty during installation if there are any misalignments between the fixed retainer and the opening in the instrument panel.

It is an object of the present invention to solve the aforementioned problems and to provide an airbag device in which a lid is substantially not connected to a retainer. It is another object of the present invention to prevent the lid from lifting from the instrument panel.

SUMMARY OF THE INVENTION

An airbag device according to the present invention includes a canister-like retainer having an opening. The device includes an airbag which is accommodated in the retainer and which has a gas inlet attached to the retainer. A lid covers the opening of the retainer and a fitting member fits the lid to an opening of an instrument panel. The device includes a pair of winding members connecting the retainer to the lid. Both ends of each winding member, which is arranged to extend along the outer surface of the retainer, are connected to the lid. The winding member is elastic and at least a portion of the winding member is in elastic contact with the outer surface of the retainer thereby biasing the lid toward the retainer.

According to another embodiment of the present invention an airbag device including a canister-like retainer having an opening is provided. The device further includes an airbag which is accommodated in the retainer and of which gas inlet is attached to the retainer. An inflator for inflating the airbag is also provided. The device includes a lid for covering the opening of the retainer and a fitting member for fitting the lid to an opening of an instrument panel. Both ends of the inflator outwardly project from the retainer. The device includes a pair of winding members connecting the retainer to the lid. Both ends of each winding member, which is arranged to extend along the outer surface of the inflator, are connected to the lid. The winding member is elastic and at least a portion of the winding member is in elastic contact with the outer surface of the inflator thereby biasing the lid toward the retainer.

In the airbag device having the structure mentioned above, the lid is pulled toward the retainer by the winding members, thereby preventing the lid from lifting from the instrument panel. Since the winding members are in elastic contact with the retainer or the inflator, the winding members never hit nor rub the retainer, thus preventing noise generation.

According to the present invention, the winding member may be directly connected to the lid or may be connected to the lid through attachments. In the latter case, it is preferable that the lid has legs projecting from the rear surface thereof to extend along the outer surface of the retainer. Attachments may be attached to the legs and the winding members connected to the attachments. This structure allows tensile biasing force of the winding members to be transmitted to a wider area of the lid.

According to a further embodiment of the present invention an airbag device to be installed in the instrument panel of a vehicle is provided. The device includes an airbag module having an airbag with an open end fixed to a retainer for receiving pressurized gas from an inflator positioned within the retainer. The device further includes a lid covering the airbag and positioned in an opening in the instrument panel. An elastic belt is connected to the lid and contacts the module on a surface facing generally away from the instrument panel to thereby hold the lid in position. The belt is positioned in a manner permitting relative movement between the module and the belt.

According to another embodiment of the present invention, an airbag device mounted in an instrument panel of a vehicle is provided. The device includes an airbag connected to a retainer and a lid covering the airbag and retainer. The lid is held in position in an opening in the panel by an elastic member fixed only to the lid and passing on an opposite side of the retainer from the panel to thereby press an edge of the lid against the panel.

It is to be understood that both the foregoing general description and the following detailed description are exemplary and explanatory only, and are not restrictive of the invention as claimed.

BRIEF DESCRIPTION OF THE DRAWINGS

These and other features, aspects and advantages of the present invention will become apparent from the following description, appended claims, and the accompanying exemplary embodiments shown in the drawings, which are briefly described below.

DETAILED DESCRIPTION

Figure 1:
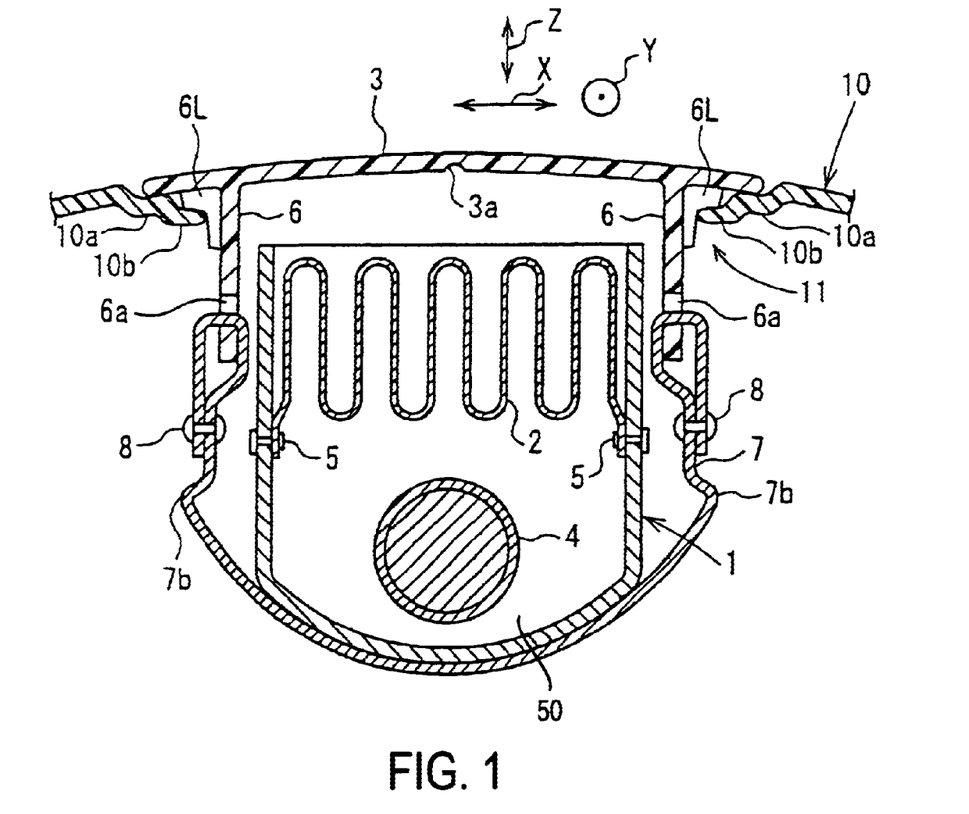
FIG. 1 is a sectional view of an airbag device according to the present invention.

Hereinafter, embodiments of the present invention will be described with reference to the attached drawings. As used herein, the upward and downward directions refer to directions crossing an instrument panel 10, that is, directions indicated by arrows Z (upward and downward directions in FIG. 1). The forward and backward directions refer to the forward and backward directions of a vehicle. That is, directions of arrows X, as shown in FIG. 1. The leftward and rightward directions refer to the vehicle width directions, that is, directions of arrows Y shown in FIG. 1.

The airbag device comprises an airbag module 50. The module 50 includes a retainer 1 having an opening formed in its top (front), an airbag 2 folded and accommodated in the retainer 1, an inflator (gas generator) 4 for deploying the airbag 2, and fittings 5 for mounting the airbag 2 to the retainer 1. The device includes a lid 3 made of synthetic resin for covering the opening of the retainer 1. In this embodiment, the retainer 1 is a canister which is long in the vehicle width direction and short in the vehicle longitudinal direction and has an opening formed in its top. The opening at its top is formed in a general rectangular shape.

The lid 3 has legs 6 projecting from the rear surface thereof. The legs 6 are arranged to extend along the peripheral surfaces of an upper portion of the retainer 1 with a predetermined space between each leg 6 and each peripheral surface. The legs 6 have elasticity so that the legs 6 are deformable in the directions of arrows X. During installation, the legs 6 are inserted through an opening 11 of an instrument panel 10 from the upper side (from a vehicle cabin).

The peripheral edge of the opening 11 is provided with a first stepped portion 10a, and a second stepped portion 10b extending from the first stepped portion 10a. The first stepped portion 10a is located lower than the outer surface of the instrument panel 10 into the side behind the instrument panel 10 and the second stepped portion is located further below the first stepped portion 10a, as shown in FIG. 1.

The lid 3 is provided with a plurality of L-like spacers 6L at the corners between the peripheral edge and the legs 6. Each spacer 6L comprises a vertical elongated portion along the outside surface of the leg 6 and a lateral elongated portion along the rear surface of the lid 3.

The vertical elongated portions of the spacers 6L of the legs 6 are inserted in the opening 11 and the lateral elongated portions of the spacers 6L are laid on the second stepped portion 10b in order to align the instrument panel and the lid. In this engaged state, the rear surface of the peripheral edge of the lid 3 is laid on the first stepped portion 10a. This mounting method provides for an instrument panel having an improved appearance.

Belts or winding members 7 are arranged to extend around the outside of the retainer 1. Each end of each belt 7 is connected to one of the legs 6. The legs 6 are formed with holes 6a through which end portions of the belt 7 are inserted. Each end portion of the belt 7 is inserted through the hole 6a and is superposed on a portion of the belt 7 and fastened by a rivet 8 as shown in FIG. 1.

Each of the belts 7 used in this embodiment may include two elastic deformable portions 7b. The elastic deformable portions 7b are positioned on both sides of the retainer 1. A portion of the belt 7 between the elastic deformable portions 7b and 7b is in elastic contact with a bottom portion of the retainer 1. As a result, the lid 3 is pulled downward toward the retainer 1 and is pressed against the instrument panel 10.

The belt 7 is composed of a knitted cord or band of synthetic resin yarns, a metallic belt such as a steel belt having elasticity, a fiber reinforced synthetic resin belt, or a rubber belt having embedded steel cords. The belt 7 is not connected to the retainer 1 but, instead, extends along the both sides and the bottom of the retainer 1. There are slight spaces between the side surfaces of the retainer and the belt 7. The slight spaces allow the lid 3 to shift in directions of arrows Z, X for alignment without being substantially obstructed by the retainer 1.

Figure 2:
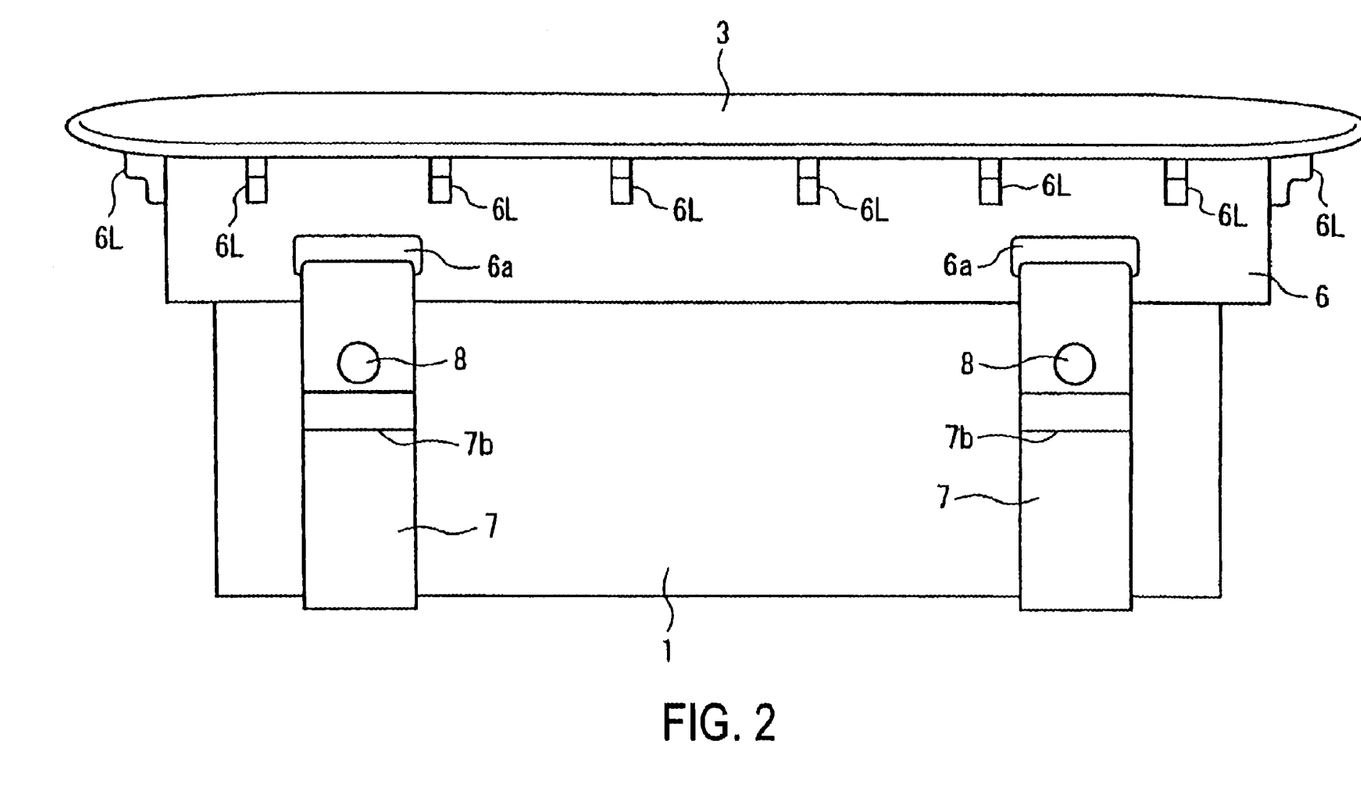
FIG. 2 is a front view of the airbag device shown in FIG. 1.

There are a plurality of belts 7 (two belts shown in FIG. 2) spaced apart from each other in the vehicle width direction (direction of arrows Y). A bracket for mounting the retainer 1 to a body member of the vehicle (not shown) is disposed on a portion between the belts 7.

Disposed on the rear surface of the lid 3 in a direction perpendicular to the legs 6 are further legs which extend along edges of the retainer 1 in the direction of arrows X, but not illustrated.

The airbag device may be installed in the instrument panel 10 by inserting the airbag device through the opening of the instrument panel 10 from above. The lateral elongated portions of the spacers 6L are layed onto the second stepped portion 10b. The rear surface of the peripheral edge of the lid 3 is layed onto the first stepped portion 10a. In addition, the retainer 1 is fixed to the body member of the vehicle through the bracket.

The lid 3 of the airbag device is not restricted by the retainer at all and, therefore, may freely shift in the upward and downward directions, the forward and backward directions, and the rightward and leftward directions. The belts 7 are not fixed to the retainer 1. Therefore, even when there is slight locational error between the airbag device and the opening 11 of the instrument panel 10, the error can be absorbed during the assembly of the airbag device into the instrument panel 10. The lid 3 can be fitted to the opening 11 in the proper attitude. In addition, for installation of the airbag device into the instrument panel, the movable range of the lid 3 is greater than that of the device shown in FIG. 8.

The lid shown in FIG. 1 can be easily formed by injection molding because under cut portions are not necessarily formed at portions corresponding to the spacers 6L in a mold for forming the lid.

In this embodiment, when the airbag device is installed in the instrument panel 10, the lid 3 is pressed against the instrument panel 10. Therefore, even when the lid 3 is pushed upward by the airbag 2, the lid 3 does not lift from the instrument panel 10. In addition, the belts 7 are prevented from hitting or rubbing the retainer 1 because the belts 7 do not generally vibrate or swing, thereby preventing noise generation.

As the inflator 4 emits gas in the event of an emergency such as a vehicle collision, the airbag 2 inflates. As a result, the lid 3 is torn along tear lines 3a to open, thereby allowing the airbag 2 to be inflated toward the inside of the vehicle cabin.

Figure 3:
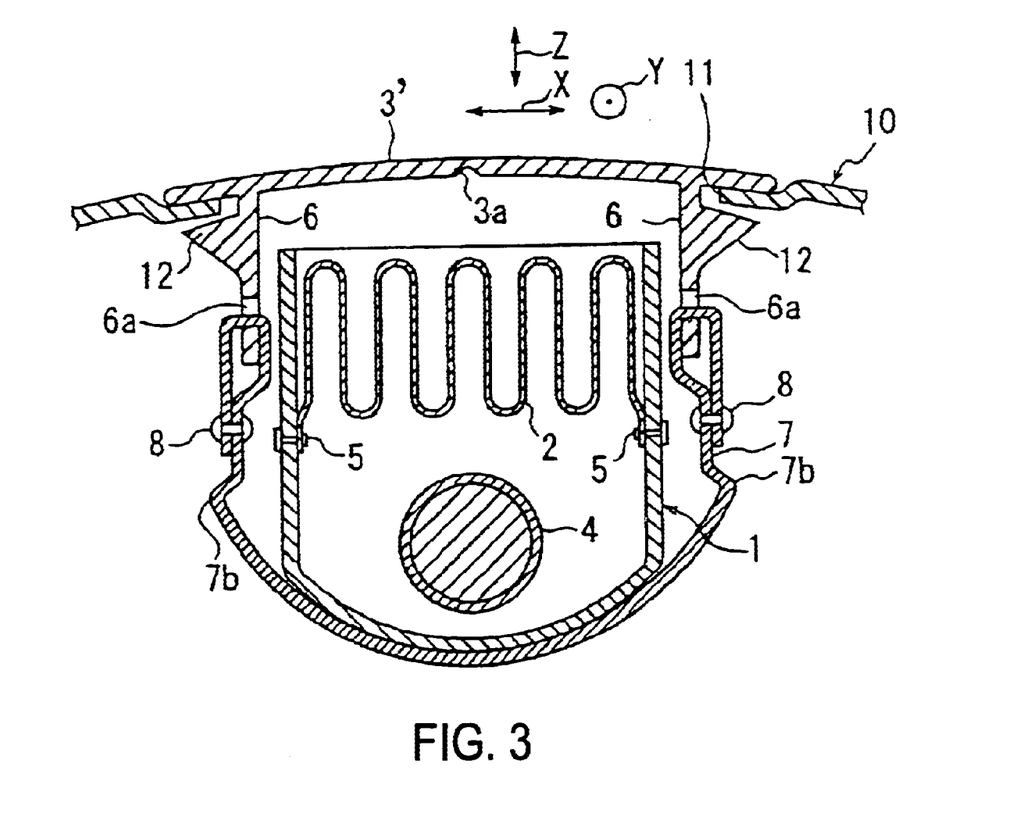
FIG. 3 is a sectional view of an airbag device according to another embodiment of the present invention.

As shown in FIG. 3, according to another embodiment of the airbag device, only one stepped portion is formed around the peripheral edge of the opening 11 of the instrument panel 10. The device includes a lid 3' having projections 12 on the outer surface of each leg 6. Interposed between the projections 12 and the peripheral edge of the lid 3' is the peripheral edge of the opening 11 of the instrument panel 10. Each projection 12 is formed to have an interior surface inclined in such a direction closer to the retainer 1 from the tip to the lowest position. When the airbag device is inserted through the opening 11 of the instrument panel 10 during installation, the inclined surfaces of the projections 12 slide on the peripheral end face of the opening 11. As a result, the projections 12 smoothly pass the edge of the opening 11. There are slight spaces between the projections 12 and the edge of the opening 11 of the instrument panel 10.

The airbag device is installed to the instrument panel 10 by first inserting the airbag module through the opening 11 of the instrument panel 10 from above of the instrument panel 10. The peripheral edge of the opening 11 of the instrument panel is sandwiched by the edges of the lid 3' and the projections 12. The retainer 1 is fixed to the vehicle by a bracket. As the lid is inserted through the opening 11, the legs 6 are deformed toward the retainer 1. After the projections pass the opening 11, the legs 6 are elastically restored to the original shape. Whereby the peripheral edge of the opening 11 is sandwiched between the projections 12 and the peripheral edge of the lid 3'.

The other components of the embodiment shown in FIG. 3 are the same as those of the airbag device shown in FIG. 1. The components common to the embodiments shown in FIGS. 1 and 3 are identified by the same reference numerals in both FIGS. 1 and 3.

Figure 4:
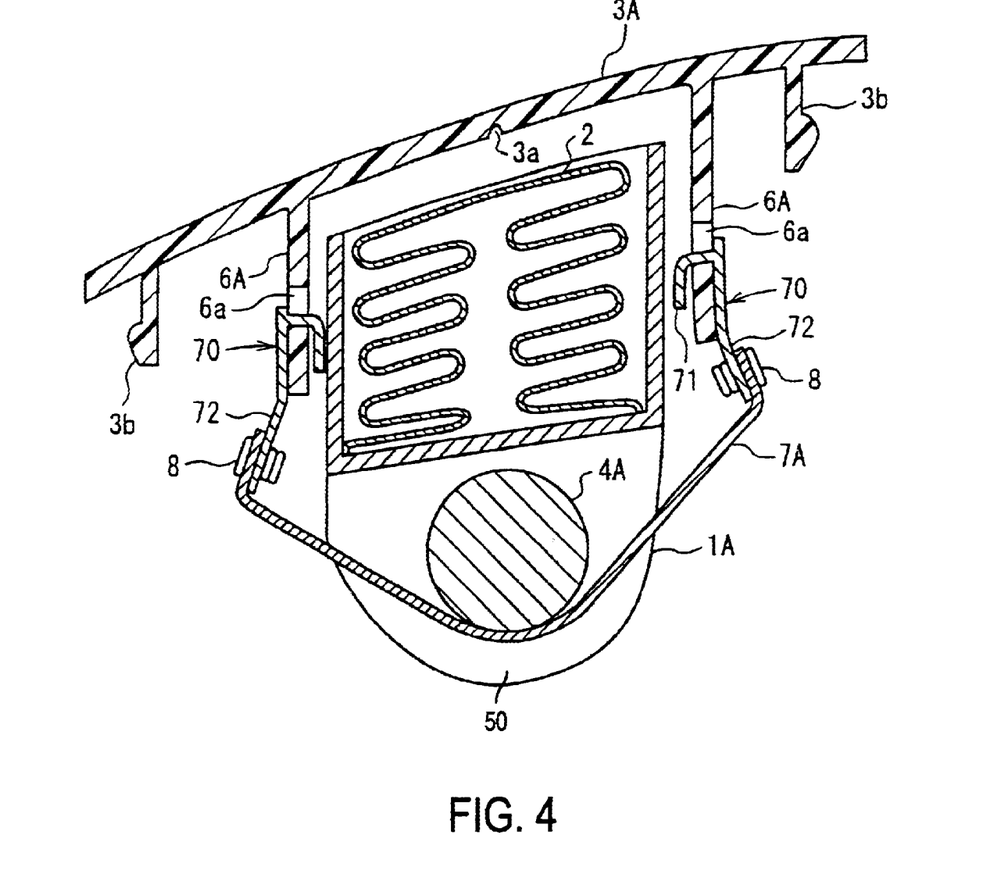
FIG. 4 is a sectional view taken along a line IV—IV of FIG. 5.
Figure 5:
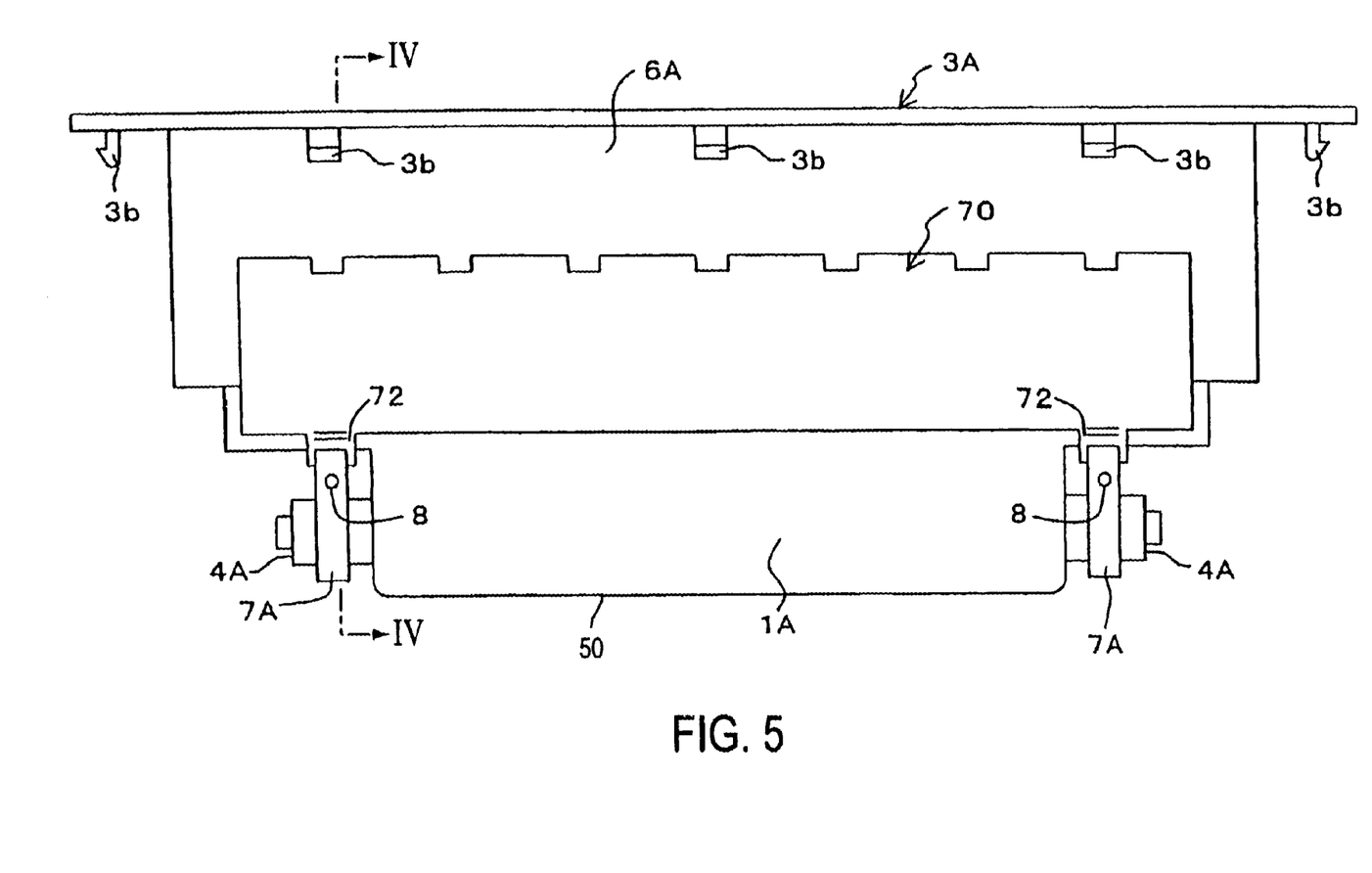
FIG. 5 is a front view showing an airbag device according to still another embodiment.
Figure 6:
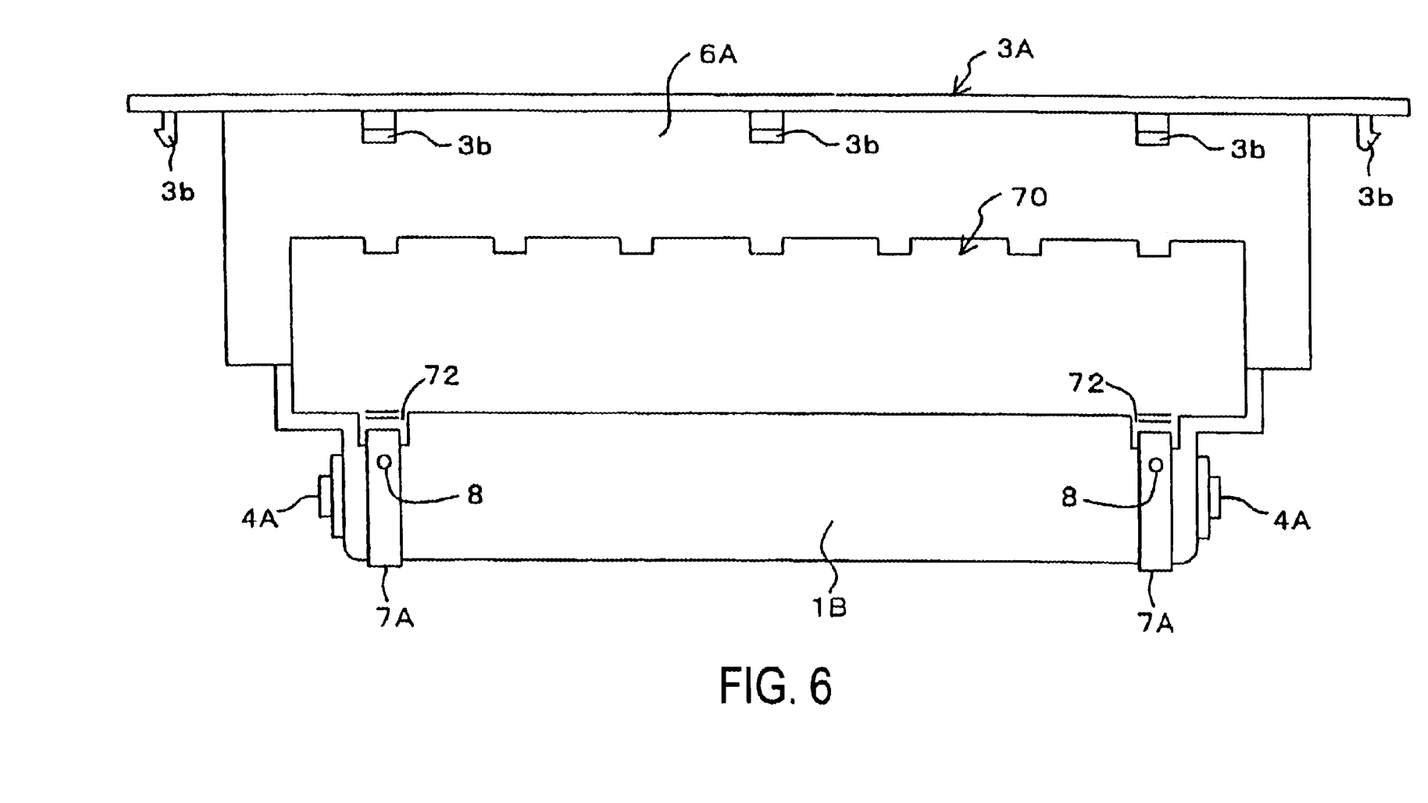
FIG. 6 is a front view showing an airbag device according to further another embodiment.
Figure 7:
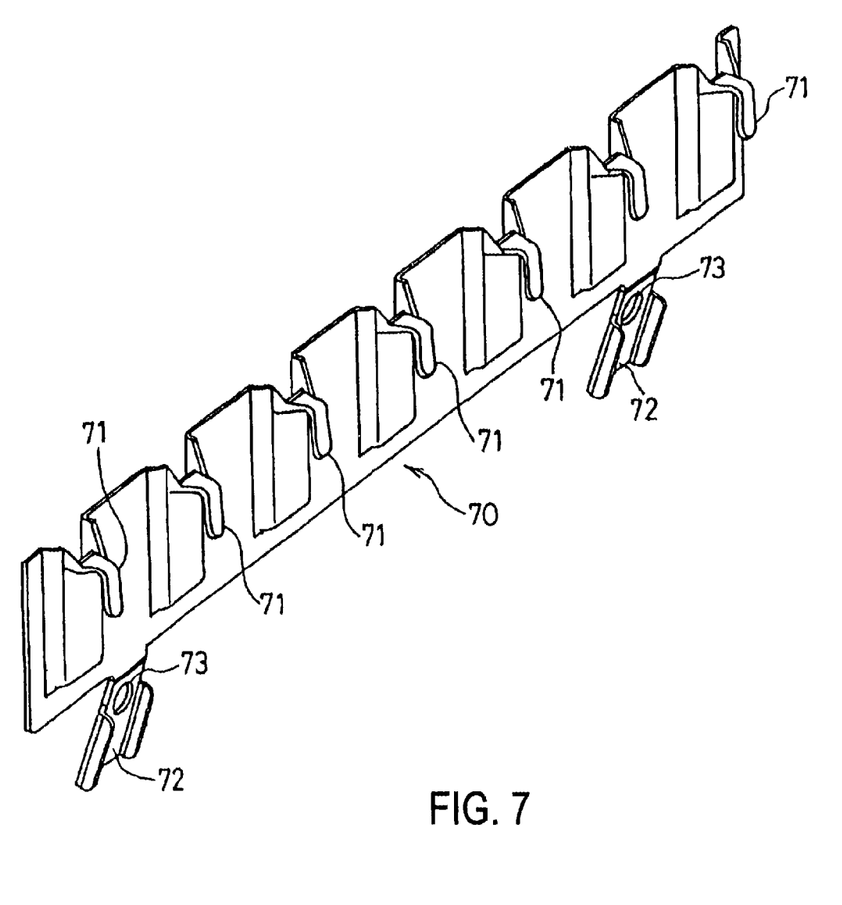
FIG. 7 is a perspective view showing a belt fixing member as an attachment.

FIGS. 4 and 5 are a sectional view and a front view showing an airbag device according to another embodiment, respectively. FIG. 4 is a sectional view taken along a line IV—IV of FIG. 5. FIG. 6 is a front view showing an airbag device according to further another embodiment, and FIG. 7 is a perspective view showing a belt fixing member as an attachment.

As shown in FIG. 4, the airbag device includes a retainer 1A having an opening formed in its top (front). An airbag 2 is folded and accommodated in the retainer 1A. A lid 3A covers the opening of the retainer 1A. An inflator (gas generator) 4A is provided for deploying the airbag 2. Fittings are provided for mounting the airbag 2 to the retainer 1A. The retainer 1A is a canister which is long in the vehicle width direction and short in the vehicle longitudinal direction and has an opening formed in its top. The opening at its top may be formed in a general rectangular shape.

As shown in FIG. 5, the lower half of the retainer 1A is shorter in the vehicle width direction than the upper half of the retainer 1A so that the both ends of the substantially cylindrical inflator 4A project outwardly from the side surfaces of the retainer 1A.

The lid 3A has legs 6A projecting from the rear surface thereof. The legs 6A are arranged to extend along the peripheral surfaces of the upper half of the retainer 1A with a predetermined space between each leg 6A and each peripheral surface. The lid 3A also has projecting clasps 3b having a hook-like shape for engaging with the instrument panel.

Belts 7A are arranged to extend around the outer periphery of the inflator 4A. Both ends of the belts 7A are fixed to the belt fixing members 70 by fasteners such as rivets 8 and bolts.

As clearly shown in FIG. 7, the fixing member 70 comprises hooks 71 to be received by holes 6a of the leg 6A, tongues 72 extending downward, and rivet holes 73 formed in the tongues 72. Preferably, the number of hooks 71 to be received by one leg 6A is greater than the number of the belts 7A. The belts 7A are preferably fastened to the tongues 72 by rivets 8. The belts 7A are not connected to the retainer 1A and the inflator 4A and just extend along both sides and the bottom of the inflator 4A. The belts 7A are in close contact with the inflator 4A.

There is a slight space between the rear surface of the lid 3A and the top of the retainer 1A. This slight space is enough to shift for positioning without being obstructed by the retainer 1A. The other components and actions of the airbag device are generally the same as those of the aforementioned airbag device as shown in FIG. 1.

As shown in FIGS. 4 and 5 the belts 7A contact the airbag module 50 at the inflator 4A. Alternatively, as shown in FIG. 6, the belts 7A may contact the module 50 at the retainer 1B. In the airbag device in FIG. 6, the length of the lower half of the retainer 1B in the vehicle width direction is longer than that of the retainer 1A of the airbag device shown in FIG. 5. The belts 7A are arranged to extend along the bottom of the retainer 1B.

The other components of the airbag device shown in FIG. 6 are generally the same as those of the airbag device in FIGS. 4 and 5 so that the same numerals indicate the corresponding parts.

Since the belts 7A are not fixed to any of the retainer 1A, 1B and the inflator 4A, the lid 3A of the airbag device in FIGS. 4 through 7 can freely shift in the upward and downward directions, the forward and rearward directions, and the leftward and rightward directions without being restricted relative to the retainer 1A, 1B. Therefore, even when there is slight locational error between the airbag device and the opening 11 of the instrument panel 10, the error can be absorbed during the installation of the airbag device into the instrument panel 10, whereby the lid 3A can be fitted to the opening 11 in the proper position. In addition, for installation of the airbag device into the instrument panel 10, the movable range of the lid 3A is greater than that of the device shown in FIG. 8.

After installation of the airbag device into the instrument panel 10, the lid 3A is pressed against the instrument panel 10. Therefore, even when the lid 3A is pushed upward by the airbag 2, the lid 3A does not lift from the instrument panel 10. In addition, the belts 7A are prevented from hitting or rubbing the retainer 1A or 1B because the belts 7A never vibrate or swing, thereby preventing noise generation.

Since the attachments 70 are provided, stress to be applied from the belts or winding members 7A to the legs 6A can be widely dispersed. Therefore, the lid 3A may be uniformly biased to the retainer 1A or 1B.

In the lid 3A of the airbag device according to the embodiments shown in FIGS. 4 through 7, the projecting clasps 3b may have simply a rod-like shape, not a hook-like shape, thereby further facilitating the molding of the lid 3A by injection molding or the like. In this case, the rod-like projecting clasps 3b may be each provided with a rib to be laid on a step formed in the instrument panel, in the same manner as the spacer of the embodiment of FIGS. 1–2, thereby increasing the rigidity of lid.

Figure 9:
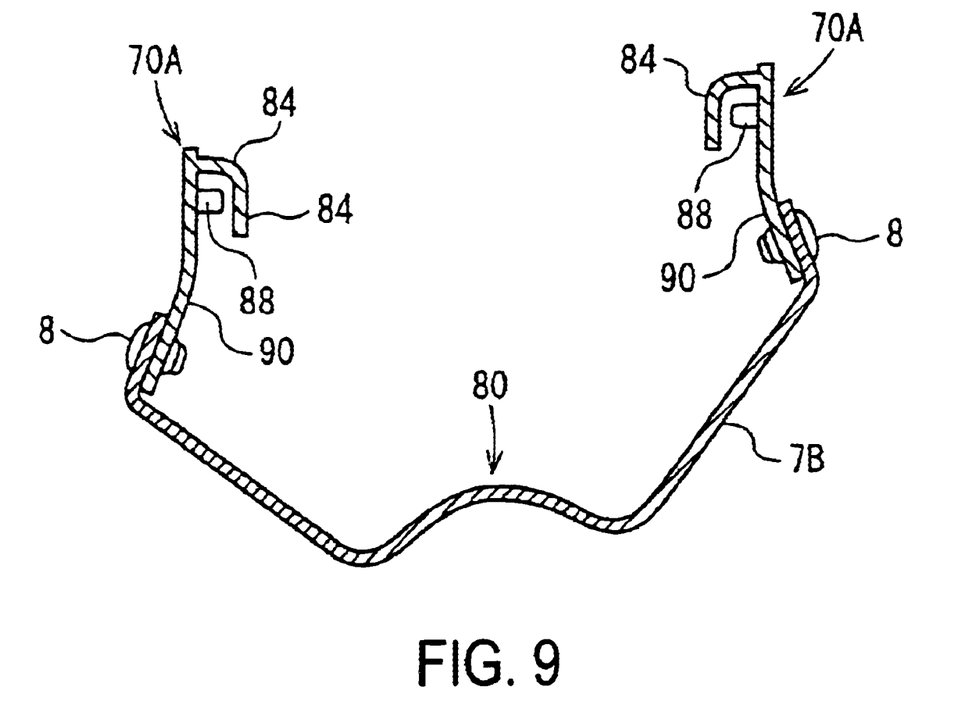
FIG. 9 is a sectional view of winding member used in an airbag device according to still another embodiment of the present invention.
Figure 10:
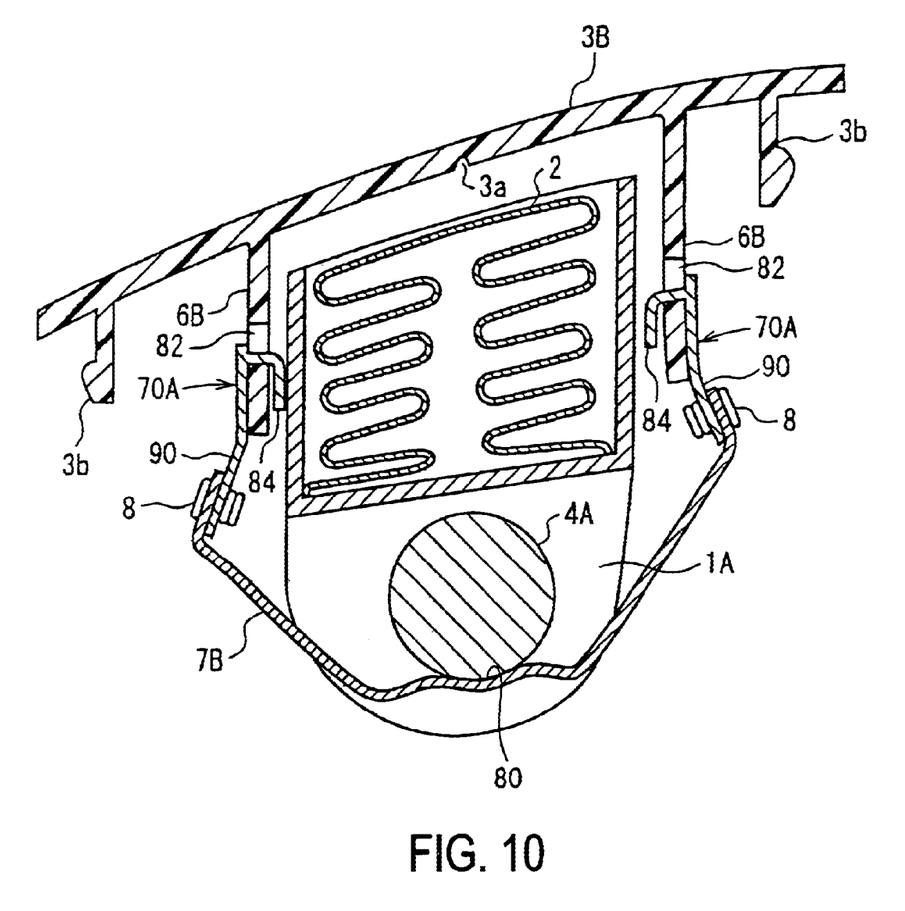
FIG. 10 is a sectional view of the airbag device to which the winding members shown in FIG. 9 are assembled.
Figure 11:
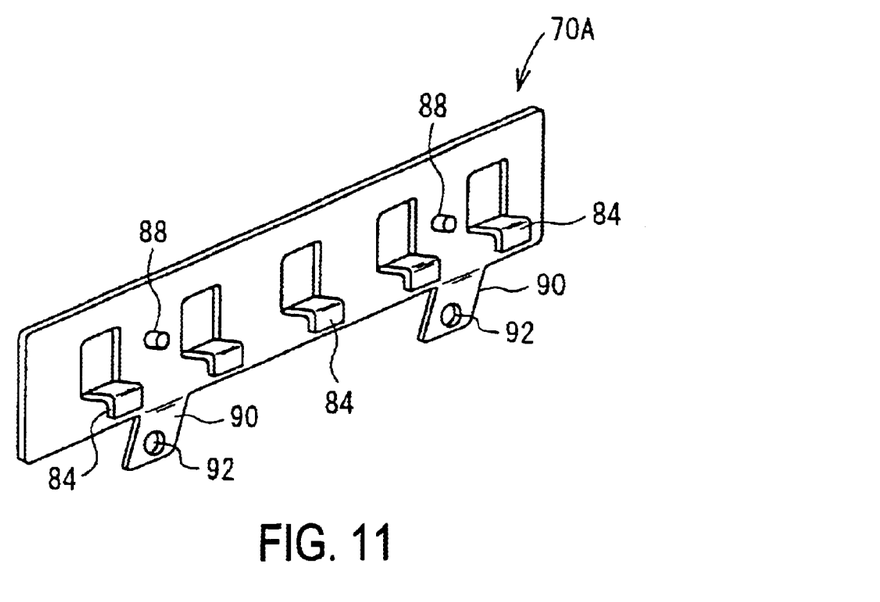
FIG. 11 is a perspective view of a fixing member for this airbag device.
Figure 12:
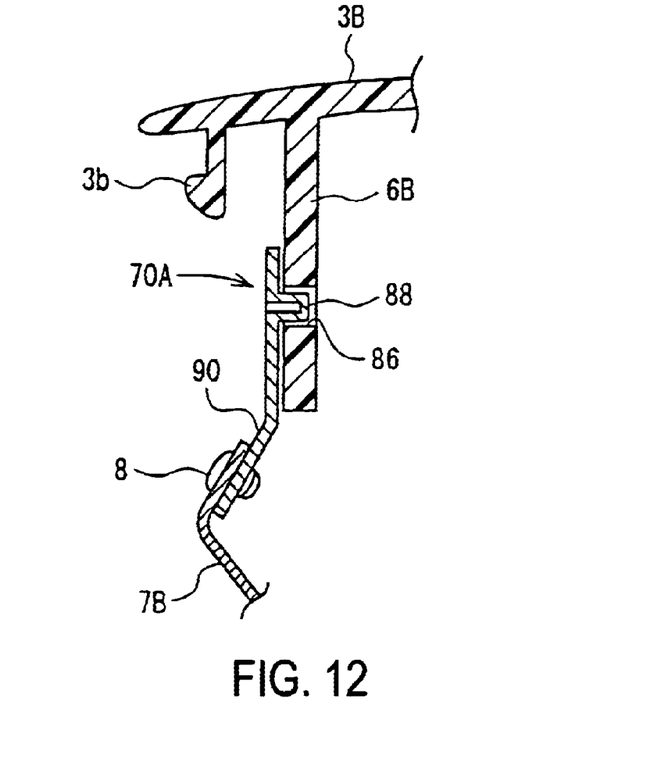
FIG. 12 is a sectional view showing the state of attaching the fixing member shown in FIG. 11 to a leg of a lid.

FIG. 9 is a sectional view of a belt 7B as the winding member used in the airbag device according to another embodiment of the present invention, FIG. 10 is a sectional view of the airbag device to which the belts 7B are assembled, FIG. 11 is a perspective view of a fixing member 70A for this airbag device, and FIG. 12 is a sectional view showing the state of attaching the fixing member 70A to the leg 6B of the lid.

As shown in FIG. 10, the belt 7B may have a convexly curved portion 80 which is formed by convexly curving a middle portion of the belt 7B. The belt 7B is elastically curved upward as a whole and arranged along the bottom of the inflator 4A. Both ends of the belt 7B are fixed to the fixing members 70A as attachments attached to the legs 6B, 6B of the lid 3B so that the top of the convexly curved portion 80 is in elastic contact with the inflator 4A.

As shown in FIG. 11, the fixing member 70A includes hooks 84 to be received by holes 82 of the leg 6B. Dowel-like projections 88 to be fitted in the pin holes 86 of the leg 6B are also provided. Tongues 90 extending downward and rivet holes 92 formed in the tongues 90 are included in the fixing member. The belts 7B are fixed to the tongues 90 by rivets 8. In the fixing member 70A, as in the fixing member 70 shown in FIGS. 4 and 5, the number of the hooks 84 to be received by one leg 6B is greater than the number of the belts 7B.

The structure of the lid 3B is generally the same as that of the lid 3A shown in FIGS. 4, 5 except that the legs 6B each provided with the holes 82 and the pin holes 86 are employed instead of the legs 6A.

The structure of the airbag device comprising the belts 7B, the fixing members 70A, and the lid 3B is generally the same as that of the airbag device shown in FIGS. 4, 5, except that the belt 7A is replaced by the belt 7B, the fixing members 70 are replaced by the fixing members 70A, and the lid 3A is replaced by the lid 3B. The description of the other components of the airbag device are omitted and the same or corresponding components in FIGS. 9 through 12 are marked by the same numerals used in FIGS. 4, 5.

In the airbag device shown in FIGS. 9 through 12 having the structure mentioned above, the tops of the convexly curved portions 80 may shift in a relatively wide range from the upper-most position to the lower-most position or from the lower-most position to the upper-most position, according to the deformation of the belts 7B. Therefore, in the state that the airbag device is installed in the instrument panel, even when the retainer 1A and the lid 3B are in such a positional relation that these are too close to each other due to their locational error, or even when the retainer 1A and the lid 3B are in such a positional relation that these are too far apart from each other, the tops of the convexly curved portions 80 can be kept in elastic contact with the inflator 4A, thereby ensuring that the belts 7B constantly exert the biasing force to the lid 3B toward the retainer 1A.

The belts 7B are not fixed to the retainer 1A or the inflator 4A. As a result, the lid 3B of the airbag device can freely shift in the upward and downward directions, the forward and rearward directions, and the leftward and rightward directions without being restricted relative to the retainer 1A. After installation of the airbag device into the instrument panel 10, the lid 3B is pressed against the instrument panel. Therefore, even when the lid 3B is pushed upward by the airbag 2, the lid 3A does not lift from the instrument panel. In addition, the belts 7B are prevented from hitting or rubbing the retainer 1A because the belts 7B never vibrate or swing, thereby preventing noise generation.

The fixing members 70A allow the stress applied from the belts 7B to the legs 6B to be widely dispersed, in the same manner as the airbag device shown in FIGS. 4, 5. Therefore, the lid 3B may be entirely uniformly biased toward the retainer 1A. In addition, the dowel-like projections 88 are fitted in the aforementioned pin holes 86 when the hooks 84 are received by the aforementioned holes 82, whereby the fixing members 70A are not allowed to move relative to the side surfaces of the legs 6B. Therefore, the hooks 84 can be securely prevented from coming off the holes 82 due to vibration and the like.

Also in the lid 3B of the airbag device according to the embodiment shown in FIGS. 9 through 12, the projecting clasps 3b may have simply a rod-like shape, not a hook-like shape. In this case, the rod-like projecting clasps 3b may be each provided with a rib to be laid on a step formed in the instrument panel, in the same manner as the spacer of the embodiment of FIGS. 1–2. This structure can facilitate the molding of the lid 3B by injection molding or the like and, because of the ribs, can increase the rigidity of lid.

As described above, in the airbag device of the present invention, the lid can freely shift in the upward and downward directions, the forward and backward directions, and the rightward and leftward directions and has a greater shifting range, thereby significantly facilitating the alignment of the lid and the opening of the instrument panel for installation of the airbag device. The airbag device is installed without conventional hook fitting, light-weight can be achieved. In the airbag device, the lid does not lift from the instrument panel and the winding members never collide with the retainer, thus preventing noise generation.

The priority applications Japanese Patent Application Nos. 2000-357924 and 2001-305434 (published on Aug. 6, 2002 as JP 2002-220020) are hereby incorporated by reference herein in their entirety.

Given the disclosure of the present invention, one versed in the art would appreciate that there may be other embodiments and modifications within the scope and spirit of the invention. Accordingly, all modifications attainable by one versed in the art from the present disclosure within the scope and spirit of the present invention are to be included as further embodiments of the present invention. The scope of the present invention is to be defined as set forth in the following claims.

What is claimed is:

1. An airbag device comprising:
   a canister shaped retainer having an opening;
   an airbag which is accommodated in said retainer and having a gas inlet attached to said retainer;

a lid for covering the opening of said retainer; and wherein the lid is configured to fit into an opening of an instrument panel;

a winding member having a pair of ends and being arranged to extend along an outer surface of said retainer wherein both ends of the winding member are connected to said lid; and wherein said winding member is elastic and at least a portion of said winding member is in elastic contact with the outer surface of said retainer whereby the lid is biased toward the retainer.

2. The airbag device of claim 1, wherein said lid has legs projecting from a rear surface thereof to extend along the outer surface of said retainer, and wherein attachments are attached to said legs and said winding member is connected to the lid via said attachments.

3. An airbag device comprising:

a canister shaped retainer having an opening;

an airbag which is accommodated in said retainer and having a gas inlet attached to said retainer;

an inflator for inflating said airbag;

a lid for covering the opening of said retainer; and wherein the lid is configured to fit into an opening of an instrument panel, wherein both ends of said inflator outwardly project from said retainer, a winding member having a pair of ends and being arranged to extend along an outer surface of said inflator wherein both ends of the winding member are connected to said lid; and wherein said winding member is elastic and at least a portion of said winding member is in elastic contact with the outer surface of said inflator whereby the lid is biased toward the retainer.

4. An airbag device to be installed in the instrument panel of a vehicle comprising:

an airbag module including an airbag having an open end fixed to a retainer for receiving pressurized gas from an inflator positioned within the retainer;

a lid covering the airbag and positioned in an opening in the instrument panel;

an elastic belt connected to the lid and contacting the module on a surface facing generally away from the instrument panel to thereby hold the lid in position; and wherein the belt is positioned in a manner permitting relative movement between the module and the belt.

5. The airbag device of claim 4, wherein the belt includes a first and second end, each end being connected to the lid.

6. The airbag device of claim 4, wherein the lid includes a spacer positioned between an edge of the lid and a portion of the panel adjacent the opening.

7. The airbag device of claim 6, wherein the lid is configured to contact a first inwardly recessed surface of the panel and the spacer is positioned between the lid and a second inwardly recessed surface of the panel located inwardly of the first recessed surface wherein the lid is received in position by the second recessed surface.

8. The airbag device of claim 4, wherein the belt includes a convexly curved portion that contacts the module.

9. The airbag device of claim 4, further comprising a fixing member connected to the lid, wherein the belt is connected to the lid indirectly through the fixing member.

10. The airbag device of claim 9, wherein the fixing member hooks onto an internal projection of the lid.

11. The airbag device of claim 9, wherein the fixing member includes a projection that fits into a hole in an internal projection of the lid to thereby secure the fixing member in position relative to the lid.

12. The airbag device of claim 9, wherein one end of the belt is riveted to the fixing member.

13. The airbag device of claim 4, wherein first and second ends of the belt are connected to internal projections on the lid.

14. The airbag device of claim 4, further comprising a second belt connected to the lid and contacting the module on a surface facing away from the instrument panel.

15. The airbag device of claim 4, wherein the surface of the module contacted by the belt is located on the inflator.

16. The airbag device of claim 4, wherein the surface of the module contacted by the belt is located on the retainer.

17. An airbag device mounted in an instrument panel of a vehicle, the device comprising an airbag connected to a retainer and a lid covering the airbag and retainer, wherein the lid is held in position in an opening in the panel by an elastic member fixed only to the lid and passing on an opposite side of the retainer from the panel to thereby press an edge of the lid against the panel.

* * * * *